US012639483B2

(12) United States Patent
Kapila et al.

(10) Patent No.: US 12,639,483 B2
(45) Date of Patent: May 26, 2026

(54) PHYSICAL COMPUTER INTRUSION DETECTION

(71) Applicant: Intel Corporation, Santa Clara, CA (US)

(72) Inventors: Smit Kapila, Bangalore (IN); Jithin Valappilekandy, Bangalore (IN); Sean J.W. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 18/524,650

(22) Filed: Nov. 30, 2023

(65) Prior Publication Data

US 2025/0181782 A1     Jun. 5, 2025

(51) Int. Cl.
G06F 21/87          (2013.01)

(52) U.S. Cl.
CPC .................................... G06F 21/87 (2013.01)

(58) Field of Classification Search
CPC ....................................................... G06F 21/87
See application file for complete search history.

(56) References Cited

U.S. PATENT DOCUMENTS

| | | | | | |
|---|---|---|---|---|---|
| 8,411,448 | B2 * | 4/2013 | Shi | ........................... | H05K 7/00 |
| | | | | | 361/752 |
| 9,135,474 | B2 * | 9/2015 | Vega | .................... | H05K 5/0208 |
| 10,157,527 | B1 * | 12/2018 | Bartley | .............. | G08B 13/2494 |

| | | | | | |
|---|---|---|---|---|---|
| 10,306,753 | B1 * | 5/2019 | Fadden | ................. | H01L 23/576 |
| 10,524,370 | B2 * | 12/2019 | Sreenivasan | ......... | H05K 5/0052 |
| 10,595,401 | B1 * | 3/2020 | Busby | .................. | H05K 3/4644 |
| 11,363,746 | B2 * | 6/2022 | Valiente | .............. | H05K 1/0242 |
| 11,681,833 | B2 * | 6/2023 | Razaghi | .................. | G06F 21/87 |
| | | | | | 726/34 |
| 12,206,760 | B1 * | 1/2025 | Mohajerani | ............. | H04L 9/003 |
| 2019/0124770 | A1 * | 4/2019 | Girardey | ................ | H05K 1/141 |
| 2019/0147197 | A1 * | 5/2019 | Razaghi | .................. | G06F 21/87 |
| | | | | | 726/34 |
| 2020/0211301 | A1 * | 7/2020 | Zhang | .................... | H04L 63/065 |

(Continued)

OTHER PUBLICATIONS

Dell Technologies, "Dell PowerEdge C4130 Owner's Manual," Copyright 2017, retrieved from https://www.itcreations.com/user-manuals/c4130/dell-poweredge-c4130-owner-manual.pdf (219 pages) pp. 62-64 (Submitted in 6 parts).

(Continued)

*Primary Examiner* — Viral S Lakhia
(74) *Attorney, Agent, or Firm* — Alliance IP, LLC

(57)          ABSTRACT

An apparatus includes a circuit board configured for attachment to a cover by a first fastener. The circuit board includes a first via sized to receive a distal portion of a first shaft of the first fastener. A first upper portion of the first shaft is to be received in a through-hole in the cover. The apparatus further includes a first conductive trace extending from a first side wall defining the first via to first circuitry. The first conductive trace is configured to carry one or more input signals to the first circuitry indicating whether the distal portion of the first shaft is at least partially disposed in the first via and communicatively coupled to a first conductive element associated with the first via. The first conductive element may include a first conductive plating at least partially covering the first side wall defining the first via.

19 Claims, 8 Drawing Sheets

(56)        References Cited

U.S. PATENT DOCUMENTS

2022/0327249  A1 *  10/2022  Kulkarni .................. G11C 5/14
2023/0179432  A1 *   6/2023  Laing ...................... G06F 21/44
2023/0244784  A1 *   8/2023  Rodriguez ............. G06F 21/75
                                                                726/34

OTHER PUBLICATIONS

Dell Technologies, "How to reset or remove an 'Alert! Cover was previously removed' message that appears when starting a Dell OptiPlex computer," Mar. 10, 2021, retrieved from https://www.dell.com/support/kbdoc/en-us/000150875/how-to-reset-or-remove-an-alert-cover-was-previously-removed-message-that-appears-when-starting-a-dell-optiplex-computer (2 pages).
Dell Technologies, "Latitude 9430/Latitude 9430 2-in-1 Service Manual," Copyright 2022, retrieved from (98 pages) pp. 87-89.
Hewlett Packard Wolf Security, Jun. 2021, "HP Tamperlock Protecting Devices from Physical Attacks" (8 pages).

* cited by examiner

FIG. 4

TRUTH TABLE
400

| Fastener A inputs 402 | Fastener B inputs 404 | Fastener C inputs 406 | Descriptions of input combinations 408 | Outputs 410 |
|---|---|---|---|---|
| 0 | 0 | 0 | Intrusion detection fasteners in tact | 1 |
| 0 | 0 | 1 | One intrusion detection fastener (C) removed | 1 |
| 0 | 1 | 0 | One intrusion detection fastener (B) removed | 1 |
| 1 | 0 | 0 | One intrusion detection fastener (A) removed | 1 |
| 0 | 1 | 1 | Two intrusion detection fasteners (B/C) removed | 0 |
| 1 | 0 | 1 | Two intrusion detection fasteners (A/C) removed | 0 |
| 1 | 1 | 0 | Two intrusion detection fasteners (A/B) removed | 0 |
| 1 | 1 | 1 | All intrusion detection fasteners (A/B/C) removed | 0 |

412

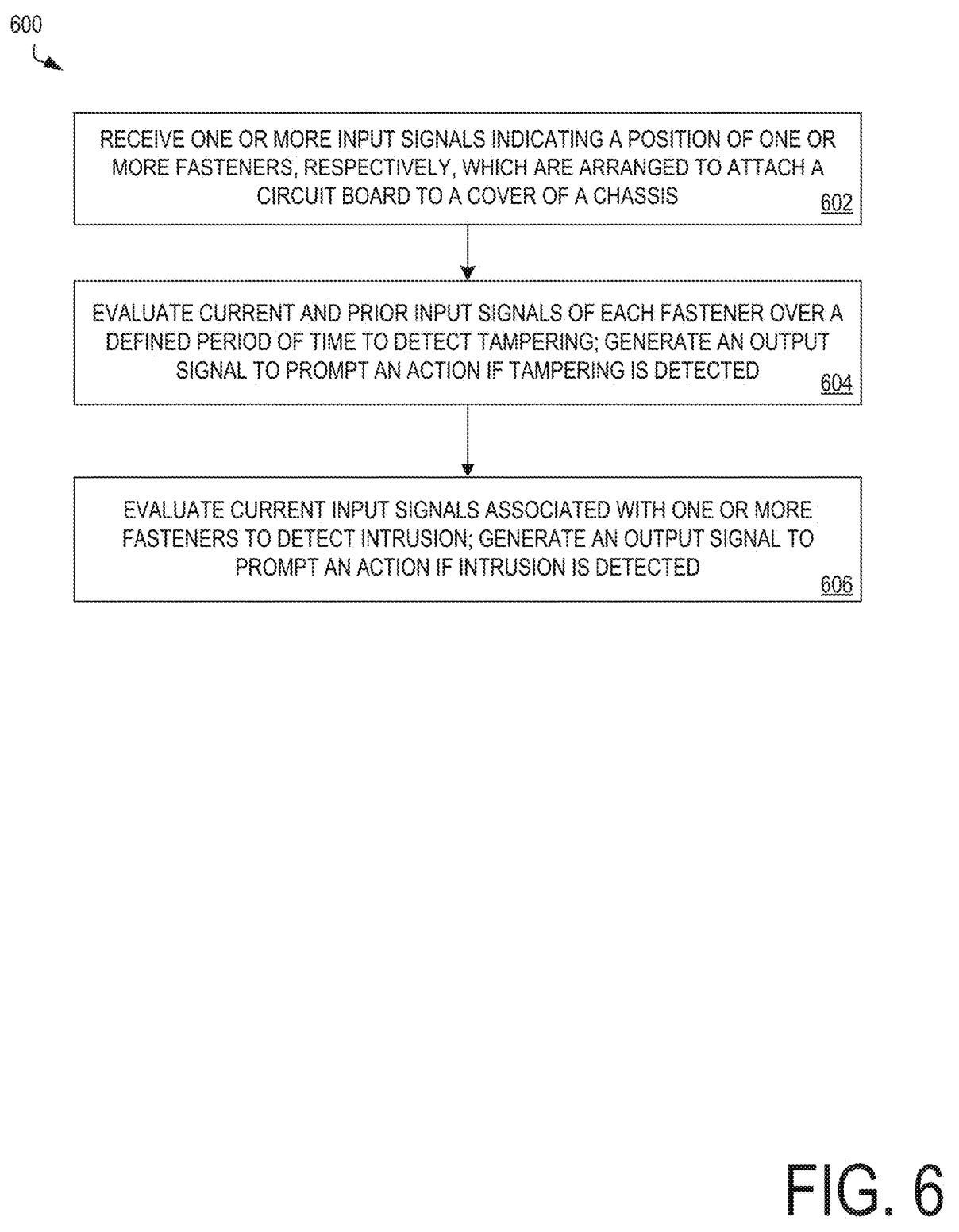

600

RECEIVE ONE OR MORE INPUT SIGNALS INDICATING A POSITION OF ONE OR MORE FASTENERS, RESPECTIVELY, WHICH ARE ARRANGED TO ATTACH A CIRCUIT BOARD TO A COVER OF A CHASSIS          602

EVALUATE CURRENT AND PRIOR INPUT SIGNALS OF EACH FASTENER OVER A DEFINED PERIOD OF TIME TO DETECT TAMPERING; GENERATE AN OUTPUT SIGNAL TO PROMPT AN ACTION IF TAMPERING IS DETECTED          604

EVALUATE CURRENT INPUT SIGNALS ASSOCIATED WITH ONE OR MORE FASTENERS TO DETECT INTRUSION; GENERATE AN OUTPUT SIGNAL TO PROMPT AN ACTION IF INTRUSION IS DETECTED          606

FIG. 6

PHYSICAL COMPUTER INTRUSION DETECTION

BACKGROUND

A growing concern of computer security involves physical attacks to electronic devices. As electronic devices have become more readily available to potential intruders, physical attacks have escalated. Malicious actors conduct such physical attacks on computers by disassembling hardware to modify or directly probe a motherboard. For example, Trusted Platform Module (TPM) probing attacks, Direct Memory Access (DMA) attacks, and flash memory replacement attacks are common examples. Additionally, concerning side channel physical attacks involve probing a system board while the system is performing sensitive operations, and using the obtained indirect data to mine protected information from the system. Technologies are needed to thwart such physical attacks.

BRIEF DESCRIPTION OF THE DRAWINGS

FIG. 4 is a truth table illustrating input values of input signals corresponding to respective fasteners in an intrusion detection system and example output values of output signals based on the input signals.

FIG. 6 is a flow diagram of a possible example process associated with the intrusion detection system.

DETAILED DESCRIPTION

Figures 1A, 1B:
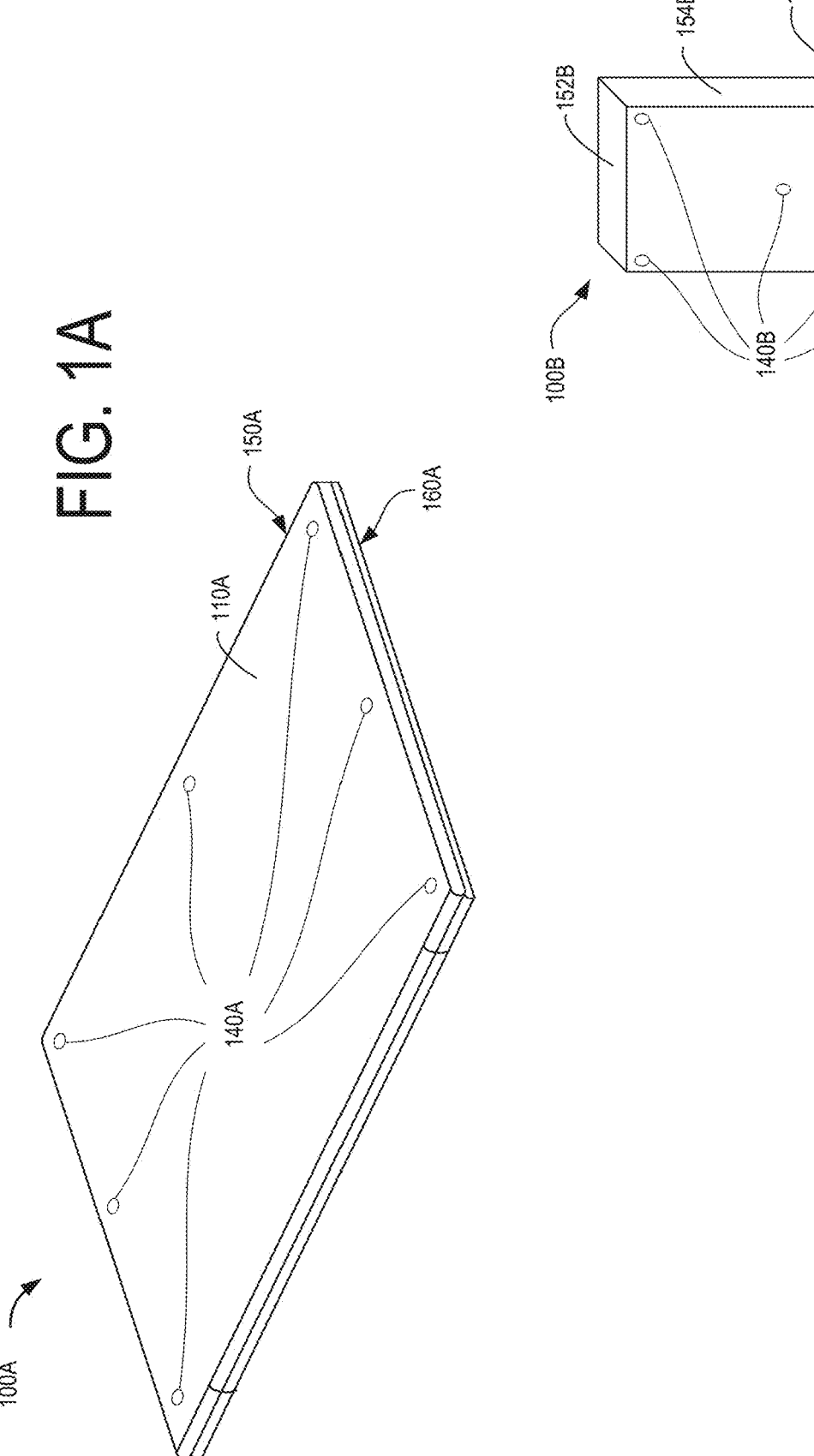
FIG. 1A is a bottom and back perspective view of an example laptop with a plurality of fasteners in a cover of a base chassis.
FIG. 1B is a back and top perspective view of an example computing device with a plurality of fasteners in a cover of a device chassis.

The present disclosure provides various possible embodiments, or examples, of systems, methods, apparatuses, architectures, and machine readable media for methods, apparatuses, and systems for detecting computer intrusion by physical attacks. In particular, embodiments disclosed herein provide for computer intrusion detection utilizing an intrusion detection system implemented with existing (or new) fasteners that secure a cover to one or more circuit boards of a personal computing device or any other computing device with one or more circuit boards contained in a chassis (also referred to herein as a "housing" or "base").

In one example, a motherboard (e.g., a single circuit board containing the main components of a computing device and optionally including connectors into which other circuit boards may be inserted) may be attached to a cover. In other examples, two or more circuit boards may be attached to a cover. The cover can include a bottom base cover of a personal computing device such as a laptop, tablet, etc., or a panel of the housing of any other device having one or more circuit boards.

Many personal computers such as laptops currently have tamper sensors on the motherboards. When an attacker opens a bottom base cover (also referred to as a "D cover" for at least some devices) of a computing device (e.g., a laptop or other computing device with a cover), a special on-board sensor detects the cover removal and provides configurable protection mechanisms against physical attacks on the internal components of the device.

A typical tamper sensor and lock mechanism includes a standalone mechanical switch/sensor that is activated and triggers a locking mechanism to shut down or otherwise prevent access to the computer system upon the removal of the bottom base cover. The mechanical switch/sensor includes a spring that is compressed when the bottom base cover is attached to the motherboard. When an attacker removes the bottom base cover, the special on-board sensor is activated by the release or decompression of the spring.

These tamper sensor and lock mechanisms can be easily breached. Generally, complete removal of a cover is required to activate the mechanical switch/sensor. An attacker can simply bypass the switch/sensor by not removing the cover completely, or by keeping the switch/sensor deactivated using simple tools or a finger to compress the spring as the cover is removed. Such actions defeat the purpose of the tamper sensor and lock mechanism.

The tamper sensor and lock mechanism also consumes considerable space on the motherboard, which could be used otherwise for more critical purposes. For example, a typical tamper sensor and lock mechanism can consume 50-100 $mm^2$ of motherboard space. Furthermore, the existing tamper sensors are an added bill-of-material cost. Additional assembly steps and manufacturing costs for a rubber stud secured to the bottom base cover to oppose the spring are needed.

A computer intrusion detection system, as disclosed herein can resolve many of the aforementioned issues (and more). In one or more embodiments, intrusion detection uses logic with one or more fasteners acting as sensors. A via defined by an interior wall in a circuit board is ground (GND) when a fastener is at least partially received in the via. In one example, the via may be configured as a plated through-hole (PTH) formed in the circuit board by drilling a hole through the circuit board and electroplating the side wall with a conductive material, or by any other suitable technique. When a distal end of the fastener is at least partially received in the PTH, the distal end contacts conductive plating on the side wall defining the through-hole in the circuit board. The conductive plating and a conductive trace can provide a connection to intrusion detection logic on the circuit board. A fastener that is at least partially disposed in the via (e.g., a PTH) because the fastener extends far enough into the via to make contact with (e.g., engage, connect to) the conductive plating or another conductive element that communicatively couples the fastener to the intrusion detection logic is referred to herein as being 'in a connected position.' A fastener that is removed from the via or that is at least partially removed from the via because the fastener does not extend far enough into the via to make contact with (e.g., engage, connect to) the conductive plating or another conductive element that is communicatively coupled to the intrusion detection logic is referred to herein as being 'in a disconnected position'. The conductive plating can electrically couple the fastener to the intrusion detection logic by a conductive trace, wire, or other element extending (alone or in conjunction with one or more other conductive elements) from the conductive plating to circuitry providing the intrusion detection logic. The extent to which a fastener extends into a via to make contact with conductive plating or another conductive element depends on the configuration and placement of the conductive plating or other conductive element.

When a fastener is in a connected position, a ground loop is formed with the cover, which is grounded by at least one other conductive element to the system ground of the circuit board. When the fastener is in a disconnected position, the ground loop is broken. A fastener may transition to a disconnected position if the fastener is moved such that it no longer engages the conductive plating or other conductive element that communicatively couples the fastener to the intrusion detection logic on the circuit board. Thus, the configuration and placement of the conductive plating or other element that is to engage the fastener can determine how far the fastener extends into the circuit board via to realize a connected position. In one nonlimiting example, a plated through-hole is defined by a side wall in a circuit board and the side wall is entirely covered with a conductive plating. In this example, a fastener that is at least partially disposed in the via engages the conductive plating and continues to engage the conductive plating until the fastener is removed entirely from the via. In at least one example, an intrusion detection unit, which can include the intrusion detection logic, detects when the fastener (or a combination fasteners) are out of position and then triggers a locking mechanism or other appropriate action to prevent access to the computing system and/or to send an appropriate alert and/or to log the intrusion detection.

The computer intrusion detection system as disclosed herein provides several advantages. First, implementation of the computer intrusion detection system causes no impact to a cover or system identifier (ID) of the device. The cover could be, for example, a bottom base cover of a laptop or handheld device, a back (or other) panel of a chassis or case containing one or more circuit boards, or any other housing or enclosure that protects computer components including one or more circuit boards. Second, the computer intrusion detection system provides significant savings in the bill of materials with respect to existing tamper sensors. Third, space on the circuit board can be saved by implementing the computer intrusion detection system because instead of using large electromechanical sensors, existing fasteners that attach a cover to a circuit board are utilized to implement the sensor signals indicating whether the cover has been removed. Additionally, a more simplified manufacturing process can be used because no additional part is needed for attachment to the cover. Furthermore, no new manufacturing process is needed to implement the computer intrusion detection system disclosed herein.

FIGS. 1A and 1B are perspective views of example computing devices in which an intrusion detection system as described herein may be implemented. FIG. 1A is a bottom and back perspective view of an example laptop 100A with one or more fasteners 140A. The laptop 100A includes a bottom chassis 150A (e.g., a base) and a top chassis 160A (e.g., a lid). In this example, a motherboard is contained in the bottom chassis 150A and is attached to a cover 110A by one or more fasteners 140A. The cover 110A in this example is a bottom panel of the bottom chassis 150A (or base). The fasteners may be any suitable type of removable mechanical fastener made of conductive material that extends from the cover 110A to the motherboard (not visible) within the bottom chassis 150A. Nonlimiting examples include screws (e.g., partially or fully threaded), bolts, bolts and nuts, metal dowel rods, etc. made of a conductive metal (e.g., steel, copper, aluminum, brass, etc.). In this example, seven fasteners 140A are spaced around three edges of the cover 110A. The other edge is adjacent to a hinge mechanism to enable the top chassis 160A (or lid) to pivot relative to the bottom chassis 150A (or base) and open to reveal at least one display screen. The number of fasteners and placement of fasteners may vary depending on the particular design of the chassis and cover and of the motherboard be attached to the cover.

FIG. 1B is a back and top perspective view of an example computing device 100B with one or more fasteners 140B. The computing device 100B represents, for example, a personal computer, server, appliance, gaming box, or any other computing device with a chassis having at least one panel attached to a circuit board disposed within the chassis. In this example, a motherboard is contained in a chassis 150B and attached to a cover 110B of the chassis by the one or more fasteners 140B. The cover 110B in this example is a back panel of the chassis 150B (or housing). A top panel 152B and a side panel 154B of the chassis 150B, each of which adjoin the cover 110B, are also visible in FIG. 1B. The fasteners may be any suitable type of removable mechanical fastener made of conductive material (e.g., steel, copper, aluminum, brass, etc.) that extends from the cover 110B to the motherboard (not visible) within the chassis 150B, as described herein. In this example, a fastener is disposed at each corner of the cover 110B and one fastener is disposed in substantially the middle of the cover 110B. The number of fasteners and placement of fasteners may vary depending on the particular design of the chassis and cover and of the circuit board(s) to be attached to the cover.

Figures 2A, 2B:
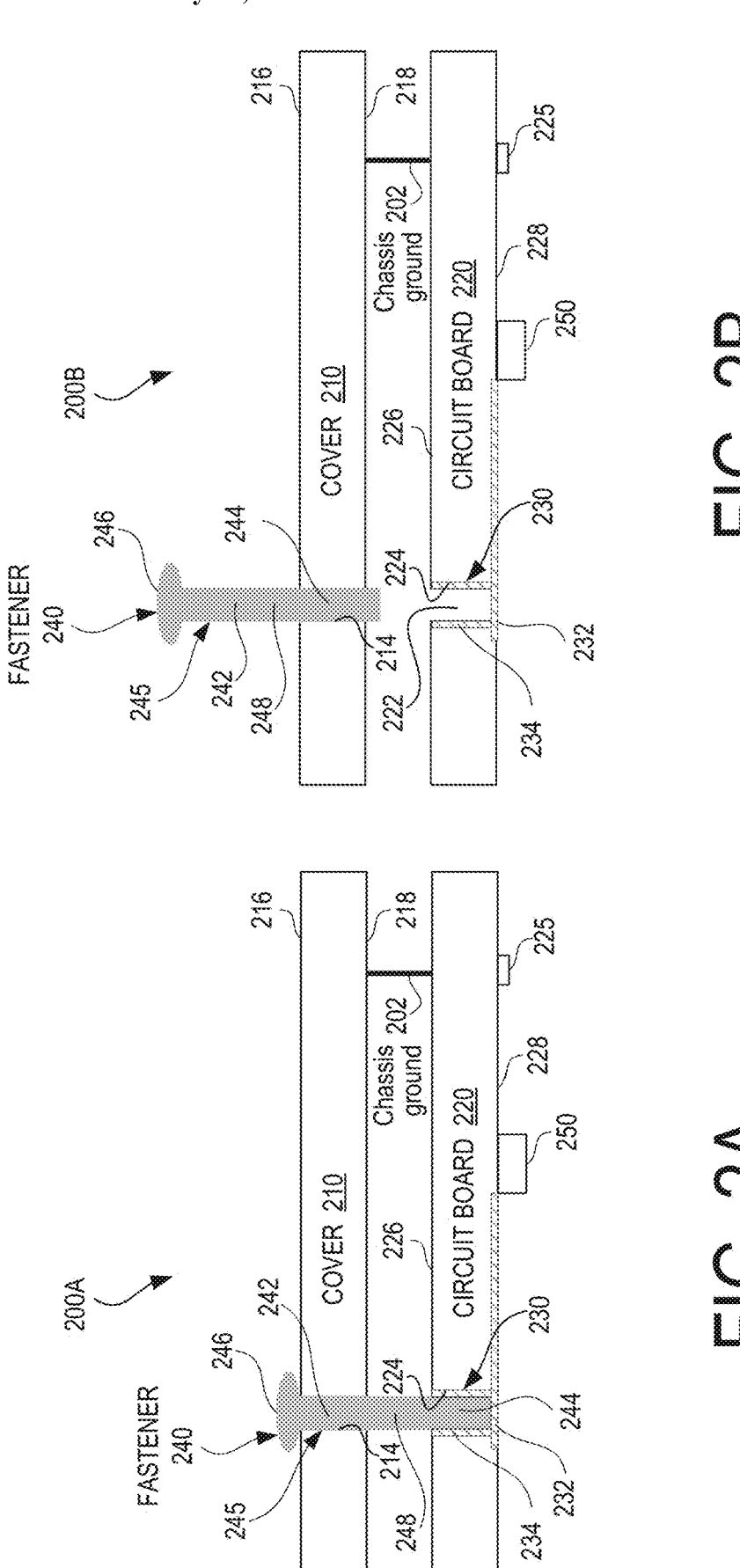
FIG. 2A is a block diagram illustrating a side view representation of a cover attached to a circuit board by a fastener and the fastener communicatively coupling the cover to the circuit board.
FIG. 2B is a block diagram illustrating another side view representation of the cover, the circuit board, and the fastener of FIG. 2A, with the fastener removed from the circuit board and communicatively uncoupled from the circuit board.

FIG. 2A illustrates a partial side view representation 200A of a cover 210 of a chassis of a computing device attached to a circuit board 220 by a fastener 240. FIG. 2B illustrates a partial side view representation 200B of the cover 210 and circuit board 220, with the fastener 240 removed from the circuit board 220. The cover 210 may be a part, panel, extension, or portion of a chassis of an electronic device such as a computing device. The chassis can be any suitable structure that holds one or more circuit boards therein including, but not limited to, a case, a base, a housing, an enclosure, etc. The cover 210 includes an outer surface 216 and an inner surface 218. The circuit board includes a first surface 226 and a second surface 228. When the circuit board 220 is attached to the cover 210, and the circuit board 220 and the cover 210 may be in substantially parallel alignment and arranged such that the first surface 226 of the circuit board 220 is spaced from and opposes the inner surface 218 of the cover 210.

Fastener 240 is configured to function as a sensor to provide signals that indicate whether the fastener is attached to the circuit board or is removed (or partially removed in some configurations) from the circuit board. Optionally, additional fasteners may also be present but are omitted in FIGS. 2A-2B for simplicity. One or more of the additional fasteners may also function as sensors to provide signals that indicate whether those one or more additional fasteners are attached to the circuit board in a connected position or removed (or partially removed) and disconnected from the circuit board. One or more other additional fasteners may be present to secure the cover 210 to the circuit board 220 without being configured to function as sensors.

Fastener 240 may be embodied in any suitable form to removably attach a cover to a circuit board and enable a ground loop to be formed when the fastener is attached to the circuit board such that the fastener makes contact with a conductive element in the circuit board. In one example as shown in FIGS. 2A-2B, fastener 240 may include a head 246 attached to a shaft 245. The head 246 may have a larger outer perimeter than the shaft 245 to enable a mechanical stop at the outer surface 216 of the cover when the shaft 245 is inserted in a through-hole of the cover 210. The shaft 245 can include an upper portion 242, a distal portion 244, and an intermediate portion 248 between the upper and lower portions. Fastener 240 is representative of other fasteners that may be used to attach a cover of a chassis to a circuit board in an electronic device.

When the fastener 240 is in a connected position (e.g., attaching the cover 210 to the circuit board 220 as shown in FIG. 2A), fastener 240 extends through a through-hole defined by a first side wall 214 formed in the cover 210, and into a via 222 defined by a second side wall 224 formed in the circuit board 220. The first and second side walls 214 and 224 may be sized and shaped to conform to an outer shape of a shaft 245 of the fastener 240. In one example, fastener 240 is a screw in which the outer side of the shaft 245 is defined in a spiral thread pattern that coils around the shaft in either a clockwise or counter-clockwise direction. In other examples, a bolt or any other suitable removable component (with or without the feature of fastening the circuit board to the cover) that enables electrical connection between the cover 210 and the circuit board 220 could be used.

The cover (or another portion of the housing attached to the cover) is separately grounded to a system ground 225 of the circuit board. For example, a chassis ground conductor 202 (e.g., conductive tape, wire, another fastener that terminates at system ground, etc.) can be coupled to the system ground to ground the cover 210. In this example, the chassis ground conductor 202 extends from cover 210, through circuit board 220 to system ground 225. Although system ground 225 is illustrated as a discrete component, this is for ease of illustration and in at least some scenarios, system ground 225 comprises a layer (or a portion of a layer) of the circuit board 220. The upper portion 242 of fastener 240 is in contact with the first side wall 214 of cover 210 and therefore, is also grounded by the chassis ground conductor 202 coupled to system ground 225.

Conductive elements 230 in the circuit board communicatively couple the fastener 240 with at least one component on the circuit board 220 and create a ground loop when at least a portion of the shaft 245 of the fastener 240 is disposed in the via 222 and is in contact with at least one of the conductive elements 230. In an example, conductive elements 230 can include a conductive plating 234 and a conductive trace 232. The conductive plating 234 and conductive trace 232 may comprise copper or any other suitable conductive material that may be used on a circuit board. In some scenarios, an epoxy resin may be applied to the second side wall 224. The conductive plating may comprise a layer of copper that is applied to the epoxy resin using an electroplating technique. When the shaft of the fastener is threaded (e.g., a screw), the side wall is formed with a corresponding threaded pattern and the material is applied to the threaded surface. Alternatively, the conductive plating may comprise a copper cylinder, which is placed in a hole formed in the circuit board to create the side wall for a via.

When at least the distal portion 244 of the shaft 245 of the fastener 240 is threaded, the inner walls of the cylinder are formed with a corresponding threaded pattern.

The conductive plating 234 (e.g., applied layer of conductive material or cylinder of conductive material) may cover some or all of the second side wall 224 in the circuit board 220. As shown in the example of FIGS. 2A-2B, the conductive trace 232 may extend along the second surface 228 of the circuit board 220 from the conductive plating 234 to an intrusion detection unit 250. The conductive trace 232 can carry input signals to the intrusion detection unit 250 to enable detection of ground contact transitions based on the position of the distal portion 244 of the fastener 240. In an alternative, the intrusion detection unit 250 may be placed on the first surface 226 of the circuit board 220 and the conductive trace 232 may extend along the second surface 228 of the circuit board 220 and couple to the intrusion detection unit (on the first surface 226) through another via (not shown), which may or may not be adjacent to the intrusion detection unit. In other examples, a conductive trace may extend along the first surface 226 of the circuit board 220. In this scenario, the conductive trace can extend from the conductive plating 234 to an intrusion detection unit placed on the first surface 226 of the circuit board 220. Alternatively, for intrusion detection unit 250, which placement is shown on the second surface 228, a conductive trace may extend from the conductive plating 234 along the first surface 226, and may couple to the intrusion detection unit 250 through another via (not shown), which may or may not be adjacent to the intrusion detection unit 250. In yet another example, a conductive trace may be configured as part of an internal layer of the circuit board 220 and may extend from the conductive plating of the via 222 to conductive plating of another via providing communicative connection to the intrusion detection unit 250.

The signals carried by conductive trace 232 can indicate whether the fastener is attached to the circuit board in a connected position as shown in FIG. 2A (e.g., ground loop is closed) or is in a disconnected position as shown in FIG. 2B (e.g., the ground loop is open). The ground loop is closed (e.g., created or formed) when the distal portion 244 of the fastener 240 contacts the conductive plating 234 and/or the conductive trace 232 in the via 222. This occurs due to the cover 210 being connected to system ground 225 of the circuit board 220 by chassis ground conductor 202 and/or some other connection to the system ground. A low signal (e.g., logic 0) is carried over conductive trace 232 when the ground loop is closed. The ground loop is open (e.g., broken or ended) when the fastener does not contact, engage, or otherwise connect to any of the conductive elements 230 on the circuit board 220. In one example, a pull-up resistor (e.g., inside or outside the direct current) can be connected to the conductive trace 232 and to voltage-in to cause a high signal (e.g., logic 1) to be carried over conductive trace 232.

The ground loop can remain closed as the fastener 240 is being removed from the circuit board as long as some surface area of the distal portion 244 of the fastener 240 continues to engage or contact the conductive plating 234. The ground loop is broken when the distal portion 244 of the fastener 240 is removed from the via 222 of the circuit board 220 as shown in FIG. 2B, or is otherwise not contacting or engaging the conductive trace 232 or conductive plating 234. In the example shown in FIGS. 2A-2B, the conductive plating 234 extends along the entire length of the side wall 224. Thus, the ground loop could remain closed until the distal portion 244 of the fastener 240 is entirely removed from the via 222 as shown in FIG. 2B, for example. In another possible scenario, the conductive plating 234 might extend from the conductive trace only halfway up (or some other proportion) the side wall 224. In this scenario, the ground loop could be broken once the distal portion 244 of the fastener 240 no longer contacts or engages the conductive plating 234, but while part of the distal portion 244 is still disposed in the upper half of the via 222.

When fastener 240 is removed and the ground loop is broken, the signal on the conductive trace 232 changes from a ground signal (e.g., low) to a non-ground or default signal (e.g., high), and the intrusion detection unit 250 detects this ground contact transition by the fastener. Similarly, when fastener 240 is inserted into the via 222 and the ground loop is closed, the signal on the conductive trace 232 changes from a non-ground or default signal (e.g., high) to a ground signal (e.g., low), and the intrusion detection unit 250 detects this opposite ground contact transition by the fastener.

If multiple fasteners are used to attach the circuit board 220 to the cover 210 and to act as sensors, the intrusion detection unit 250 can detect the ground contact transitions of each fastener. In at least one example, the particular combination of input signals received from the multiple fasteners can be used to determine whether an intrusion is detected. In other examples, a threshold value can be compared to the number of fasteners associated with ground contact transitions indicating that the fasteners are at least partially removed and are disconnected from conductive elements associated with corresponding vias (e.g., signal transitions from low to high). An intrusion can be detected based on the comparison to the threshold value. In some scenarios, the use of particular combinations of input signals may be used to effectively produce output signals that are based on a threshold value representing a maximum number of fasteners that can be associated with ground contact transitions indicating that the fasteners are at least partially removed without triggering a response.

If an intrusion is detected based on the particular combination of input signals or based on a threshold value, then an output signal can be generated to prompt an action or response (e.g., sending an alert or notification, performing a system action including shutting down system or locking system, logging possible intrusion, etc.) to a possible intrusion into the system. Additionally, ground contact transitions can also be analyzed to detect patterns of contact (ground loop formed) and non-contact (ground loop broken) so that potential intrusions are detected and an appropriate response is triggered (e.g., alert, system action, etc.). Detecting patterns of contact can prevent scenarios where an intruder attempts to circumvent the intrusion detection system by removing a fastener and quickly replacing the fastener with another conductor (e.g., a wire) in order to retain ground contact.

Figure 3:
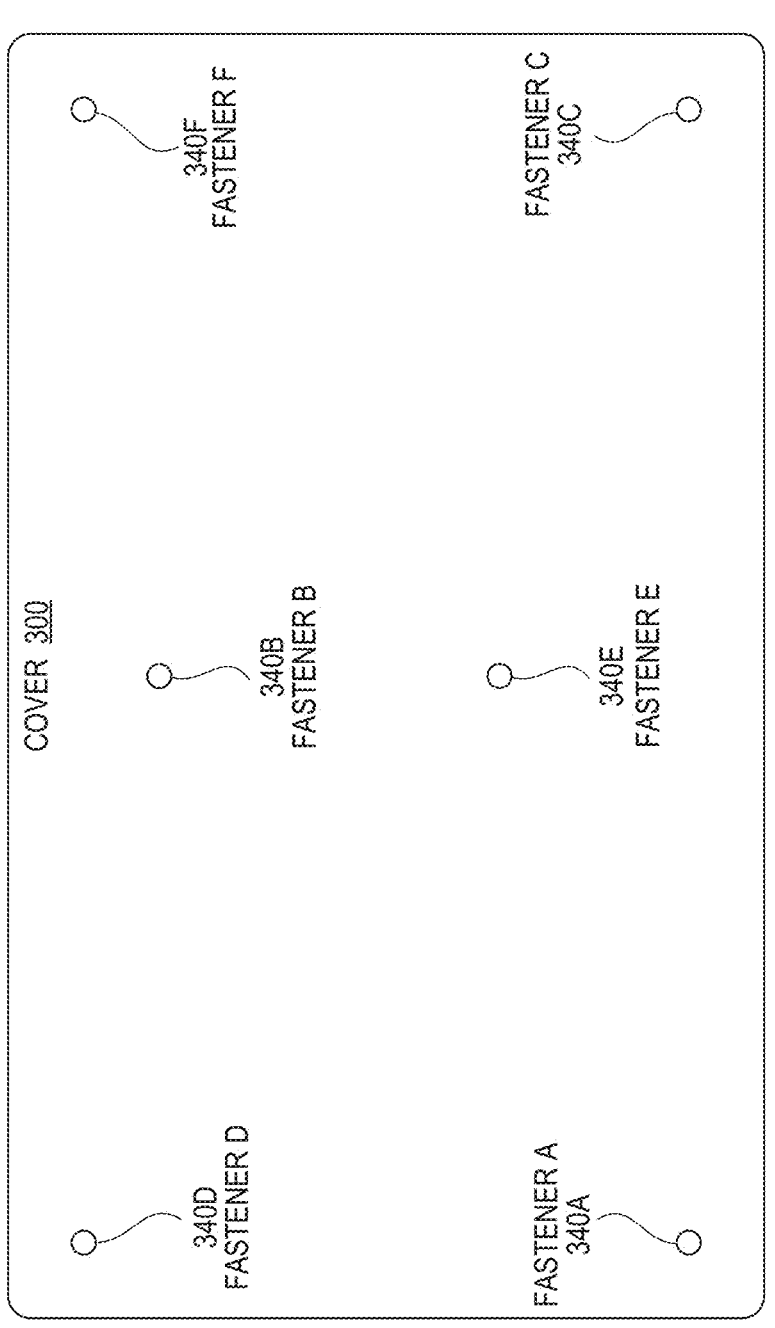
FIG. 3 is a plan view of a cover of a chassis of a computing device with an example arrangement of fasteners attaching the cover to a circuit board.

FIG. 3 is a plan view of a cover 300 of a chassis of an electronic device with an example arrangement of fasteners 340A-340F. The fasteners 340A-340F attach the cover 300 to one or more circuit boards (not visible in FIG. 3). In the example of FIG. 3, fasteners 340A, 340B, and 340C may be implemented as shown in FIGS. 2A-2B. The circuit board (not shown) attached to cover 300 is designed such that fasteners 340A, 340B, and 340C are communicatively coupled to intrusion detection logic (e.g., an intrusion detection unit 250) and act as sensors for the ground contact transitions of those fasteners.

The fasteners that produce ground loop and non-ground (e.g., default) high signals based on the position of the fastener, function as sensors and may be provided in any suitable spacing across cover 300. Thus, the arrangement of fasteners 340A, 340B, and 340C is simply one example possible arrangement. Fasteners 340A, 340B, and 340C extend through respective through-holes in the cover 300 and through respective vias in the attached circuit board. Each of the vias in the circuit board receiving one of the sensor fasteners 340A-340C can include conductive plating and conductive traces coupling intrusion detection logic (e.g., intrusion detection unit 250) to the fasteners 340A-340C as shown and described in FIGS. 2A-2B, for example.

In some examples, to avoid false alarms (e.g., from a loose screw or other inadvertently broken ground loop), intrusion detection logic can be configured to ignore an intrusion signal (e.g., default or high signal) from a single fastener or from some other maximum number of fasteners (e.g., N fasteners) that has been defined in the algorithm. An intrusion signal is a signal on a conductive trace (e.g., 232) from a fastener that indicates the fastener has been removed from the circuit board or otherwise is not engaging the any conductive elements (e.g., conductive plating, conductive trace) associated with the via configured to receive the fastener. Removal (or partial removal) of an N+1 fastener, or of a particular pattern of fasteners, triggers necessary protective actions in the computer system. Such actions can include an alert or notification (e.g., an email, instant message, text message, alarm, etc.), an instant system shutdown, an administrative lock, an event log through a designated pin of the computer architecture, etc.

Any number (e.g., 0, 1, 2, 3 or more) of other, regular (non-sensor) fasteners may also be used to secure the cover 300 to the circuit board. In this example, the circuit board is further designed such that fasteners 340D, 340E, and 340F are not communicatively coupled to the intrusion detection logic and do not act as sensors. The regular fasteners 340D, 340E, and 340F extend through respective through-holes in the cover 300 and respective vias in the circuit board to attach the circuit board to the cover 300, but the fasteners do not form a ground loop connected to intrusion detection logic. In some implementations, one or more fasteners that are not implemented as sensors, such as fasteners 340D, 340E, and 340F, may be connected to the system ground of the circuit board to provide a ground connection for the chassis.

FIG. 4 is an example truth table 400 with possible input logic values representing input signals that correspond to respective fasteners that act as sensors and possible output logic values representing output signals of intrusion detection logic based on the input values. A first column 402 of possible input signals based on the ground connected position of fastener A, a second column 404 of possible input signals based on the ground connected position of fastener B, and a third column 406 of possible input signals based on the ground connected position of fastener C provide every possible combination of input signals. Each input signal of a fastener indicates either (1) that the fastener is at least partially disposed in within its via and is engaging or otherwise contacting or connected to at least one conductive element (e.g., conductive plating, conductive trace) associated with the via (e.g., logic value '0') or (2) that the fastener is at least partially removed from its via and is disconnected from or otherwise not contacting or engaging any of the conductive elements associated with the via (e.g., logic value '1'). A fourth column 408 provides a brief description of each possible combination of the input signals.

A fifth column 410 shows the output signals produced by intrusion detection logic based on combinations of input signals corresponding to respective fasteners A, B, and C (e.g., fasteners 340A, 340B, and 340C). Eight possible combinations of input signals are illustrated in eight rows 412 of the truth table 400. The fifth column 410 of truth table 400 is populated based on each corresponding combination of input signals in the same row. In this example, a low output signal (e.g., logic value '0') is intended to prompt an action by the computing system to respond to a possible physical instruction into the electronic device. Conversely, a high output signal (e.g., logic value '1') is intended to indicate that no physical intrusion has been detected and therefore, no responsive action by the computing system is triggered. It should be apparent, however, that the particular values representing the output signals and what the values indicate could be reversed in other implementations. For example, a high output signal could prompt an action and a low output signal could prevent the computing system from taking action.

The truth table could be designed to generate any desired output signal based on the particular combination of input signals. In one possible scenario, a single fastener may be a more critical fastener that warrants a response regardless of input signals from other fasteners. In this scenario, the removal (or partial removal) of the critical fastener (e.g., Fastener A 340A) could always result in an output signal (e.g., low logic value '0') that triggers a response to a possible physical intrusion regardless of the input signals received by other fasteners (e.g., fastener B 340B and fastener C 340C), while the removal (or partial removal) of only one of the other fasteners (e.g., fastener B 340B or fastener C 340C) may result in an output signal (e.g., high logic value '1') that does not trigger a response by the computing system. This may be desirable, for example, if the critical fastener (e.g., fastener A 340A) must always be removed to access the circuit board, but removal of the other fasteners (e.g., fasteners B 340B and fastener C 340C) alone would not allow an intruder to access the circuit board. This is just one possible scenario that could be implemented in a truth table 400 for intrusion detection logic to determine whether to prompt an action (e.g., trigger a response) from the computing system.

In the example shown in the truth table 400 of FIG. 4, the resulting output logic values representing output signals shown in the fifth column 410 reflect a maximum number (e.g., N=1) of fasteners in a disconnected position (e.g., at least partially removed from the circuit board and not engaging conductive elements associated with the via) that does not trigger a response by the computing system. The output signals shown in the fifth column 410 also reflect a minimum number (e.g., X=N+1) of fasteners in a disconnected position that triggers a response by the computing system. In the example of FIG. 4, where the maximum number of fasteners in a disconnected position that does not trigger a response equals one (e.g., N=1) and the minimum number of fasteners in a disconnected position that triggers a response equals two (e.g., X=N+1), the logic to determine an output signal (y) is represented by the following logic equation: y=AB+AC+BC. This equation can also be represented as: y=(A AND B) OR (A AND C) OR (B AND C). If the output signal triggers a response (e.g., output signal is low or logic value '0'), the response may comprise one or more of an alert or notification, an instant system shutdown, an administrative lock of the computing system, an event log through an appropriate pin of a system on a chip (SOC), or any other suitable response to the possible physical attack of the system.

Figure 5:
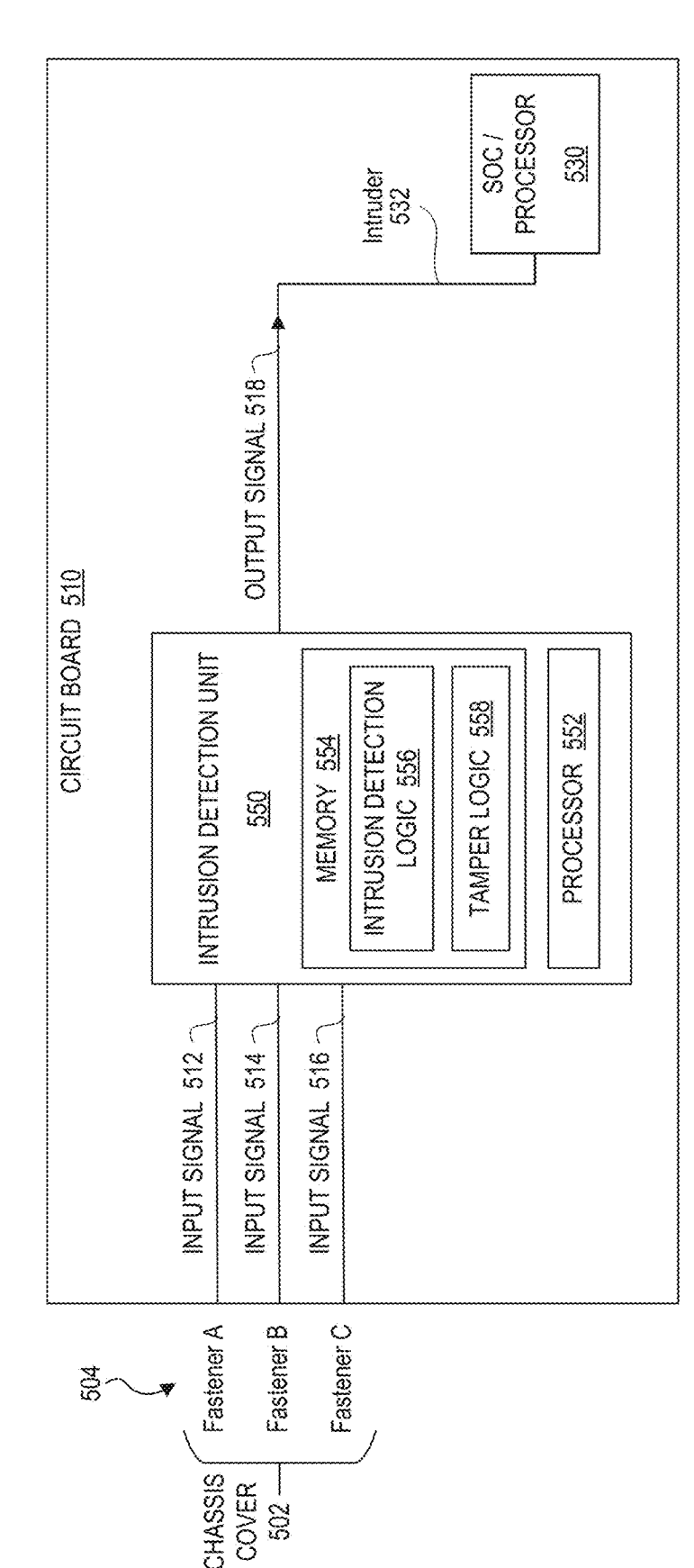
FIG. 5 is an example schematic diagram of a computing system implementing an intrusion detection system using contact transition input signals to detect the removal of one or more fasteners attaching a cover of a chassis to a circuit board.

FIG. 5 is an example schematic diagram of a computing system 500 implementing computer intrusion detection logic to detect physical intrusions of the computing system 500. The computing system 500 includes an intrusion detection unit 550 communicatively coupled to a processor 530 to provide an output signal 518 that indicates whether a physical intrusion has been detected. In one example, the output signal 518 may be provided on a conductive trace to an intruder pin 532 of the processor 530.

A plurality of fasteners 504 are used to attach the circuit board 510 to a cover 502 of a chassis that houses the computing system. The cover 502 may be any suitable panel or portion of the chassis to which the circuit board can be attached using the fasteners 504. The plurality of fasteners 504 includes Fasteners A, B, and C, in this example, and may be implemented as previously described herein (e.g., fasteners 240, 340A, 340B, and 340C). It should be appreciated that any other number of fasteners (e.g., 1, 2, 4, 5, or more) may be used for computer intrusion detection as described herein. The fasteners 504 are communicatively coupled to the cover 502, which is grounded to the system ground of the circuit board 510. Vias are formed in the circuit board 510 to receive the fasteners 504, respectively. The vias are configured with conductive elements (e.g., conductive plating on side walls of the vias, conductive traces from the vias to the intrusion detection unit 550) to enable the fasteners 504 to be communicatively coupled to the intrusion detection unit 550 when the fasteners are at least partially disposed in their respective vias and contact at least one of the conductive elements associated with their respective vias.

The position of each of the fasteners 504 cause input signals 512, 514, and 516, respectively, to be provided to the intrusion detection unit 550. At any given point in time, the position of each of the fasteners may be described as being one of (1) at least partially disposed in a via and contacting at least one conductive element associated with the via, or (2) at least partially removed from the via and disconnected from (not contacting) the conductive elements associated with the via. In one example, the input signals representing the position of the fasteners may be electrical signals (e.g., analog or digital) that have assigned values (e.g., logic value '0' and logic value '1') based on particular voltage or current level.

One logic value (e.g., '0') indicates a corresponding fastener is in a connected position. A connected position occurs when a fastener is at least partially disposed in a via of the circuit board and is connected to conductive elements (e.g., wall plating, trace) on the circuit board. In this connected position, a ground loop is closed and an input signal (e.g., logic value of '0') resulting from the ground loop created by the connected position of that fastener can be received by the intrusion detection unit 550.

Another other logic value (e.g., '1') indicates that a corresponding fastener is in a disconnected position. A disconnected position occurs when a fastener is partially or fully removed from its corresponding via in the circuit board and is disconnected from conductive elements (e.g., wall plating, trace) on the circuit board. In this disconnected position, the ground loop is broken and an input signal (e.g., default high input value of '1') resulting from the broken ground loop can be received by the intrusion detection unit 550. In other scenarios, circuitry can be implemented to reverse the input signal values such that an input value of '1' may be received when the ground loop is broken and an input of '0' may be received when the ground loop is closed.

Intrusion detection unit 550 is configured to receive input signals 512, 514, and 516, which indicate the position of their respective fasteners A, B, and C. In some scenarios, an embedded controller, embedded system, or microcontroller may be configured as an intrusion detection unit 550, and include a memory 554 and a processor 552. Memory 554 may store one or more algorithms in the form of firmware and/or software to evaluate input signals (e.g., 512, 514, and 516) and generate an output signal 518 based on the evaluation of the input signals. In other examples, an intrusion detection algorithm may be implemented in hardware, firmware, software, or any suitable combination thereof, rather than an embedded controller, embedded system, or microcontroller. In one example, circuitry in the form of logic gates may be used to implement the intrusion detection algorithm.

In at least one example, the intrusion detection unit 550 may include intrusion detection logic 556 and tamper logic 558. The intrusion detection logic 556 is configured to receive input signals 512, 514, and 516 that are produced based on the position of fasteners A, B, and C, respectively. The intrusion detection logic 556 may be further configured to produce output signal 518, based on a particular combination of input signals. In some scenarios, the resulting output signals may reflect a maximum number (e.g., N=1) of fasteners that may be in a disconnected position without triggering a response and a minimum number (e.g., X=N+1) of fasteners in a disconnected position that triggers a response. For example, intrusion detection logic 556 could be based on the maximum and minimum numbers and the logic equation used to populate truth table 400. It should be apparent, however, that intrusion detection logic 556 may be implemented using any other suitable maximum and/or minimum numbers and any other suitable logic equation to produce a desired output signal 518 based on the particular combination of input signals. Furthermore, although only three fastener input signals are illustrated in FIG. 5, a fewer number or a greater number of fasteners may be configured to provide input signals to the intrusion detection unit 550.

Intrusion detection unit 550 may also include tamper logic 558. Tamper logic 558 may be configured to analyze ground contact transitions to detect patterns of contact and non-contact so that potential malicious scenarios are identified and trigger a response (e.g., alert, system action, etc.). For example, a malicious actor could potentially try to remove one or more fasteners and replace the fasteners with wire for retaining the ground contact. A pattern of a low signal, high signal, and low signal within a particular time frame may indicate a potential intrusion by a malicious actor trying to circumvent the intrusion detection logic.

The processor 530, to which intrusion detection unit 550 is communicatively coupled, may be embodied as one or more suitable processors or processing devices for the particular computing system 500. A processor or processing device may include a general-purpose processor (e.g., Central Processing Unit (CPUs), a special-purpose processor, a single-core or multi-core CPU, a microprocessor, embedded processor, a digital signal processor (DSP), a system-on-a-chip (SoC), a co-processor, or any other processing device to execute code. Processor 530 may include any number of processing elements, which may be symmetric or asymmetric. In one embodiment, a processing element refers to hardware or logic to support a software thread and/or firmware. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one example, refers to any hardware capable of being independently associated with code, such as a software thread, operating system, firmware, application, or other code.

The processor 530 is configured to receive output signals (e.g., 518) from intrusion detection unit 550 and to respond accordingly. For example, if output signal 518 indicates that no physical intrusion has been detected (e.g., high signal '1'), then no response is needed by the processor 530. However, if the output signal 518 indicates that physical intrusion has been detected (e.g., low signal '0'), then processor 530 may take any appropriate action based on the particular design. Nonlimiting examples of possible responses to detection of physical intrusion include one or more of an alert, a system shutdown, an administrative lock, and an event log through a designated pin of the computer architecture.

FIG. 6 is a flow diagram of an example process 600 associated with intrusion detection logic 556 and/or tamper logic 558. Process 600 may be performed by hardware, firmware, software, or any suitable combination thereof. In one example, at least a portion of the example process 600 may be performed by an intrusion detection unit (e.g., intrusion detection unit 250, 550). The intrusion detection unit may comprise means such as processor 552 and memory 554, for performing the process 600. One or more operations of process 600 may be associated with a set of instructions. In at least one embodiment, one or more instructions in the set of instructions may be executed by intrusion detection logic 556 and/or tamper logic 558. In another implementation, at least a portion of process 600 may be performed by logic gate circuitry.

At 602, the intrusion detection unit receives one or more input signals indicating a position of one or more fasteners, respectively, which are arranged to attach a circuit board to a cover of a chassis housing the circuit board.

At 604, the intrusion detection unit evaluates current and some prior input signals of each fastener to detect tampering by a malicious actor to circumvent the intrusion detection logic and gain physical access to the circuit board. To detect tampering, the intrusion detection unit can evaluate patterns of ground contact transitions indicated by multiple input signals associated with a fastener over a defined period of time. For example, a determination that tampering is occurring may be made if ground contact transitions of input signals associated with a first fastener reveal a low-high-low signal pattern during a 20-second time period. The intrusion detection unit can evaluate the input signals associated with each fastener to detect tampering. If tampering is detected for one or more fasteners, then an output signal is provided to a system processor (e.g., processor 530) to trigger or prompt an appropriate action (e.g., alert, system shut down, administrative lock, logging intrusion detection information, etc.).

At 606, the intrusion detection unit evaluates the current input signals associated with the fasteners configured to act as sensors to detect intrusion by a malicious actor to gain physical access to the circuit board. To detect intrusion, the intrusion detection unit can evaluate the particular combination of input values corresponding to the current input signals. Intrusion can be detected based on the particular combination as defined in a truth table (e.g., truth table 400). In some examples, intrusion may be detected based on the maximum and/or minimum threshold numbers and a logic equation similar to the logic equation used to populate truth table 400. In other examples, the specific combinations of input values corresponding to the current input signals may be defined without regard to maximum or minimum threshold numbers.

Example Computer Architectures.

Detailed below are descriptions of example computer architectures. Other system designs and configurations known in the arts for laptop, desktop, and handheld personal computers (PC) s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein, and which incorporate a cover for the computer architecture (e.g., on a motherboard) are generally suitable. Accordingly, examples disclosed herein can include, but are not limited to, configurations illustrated in FIGS. 7-8.

Figure 7:
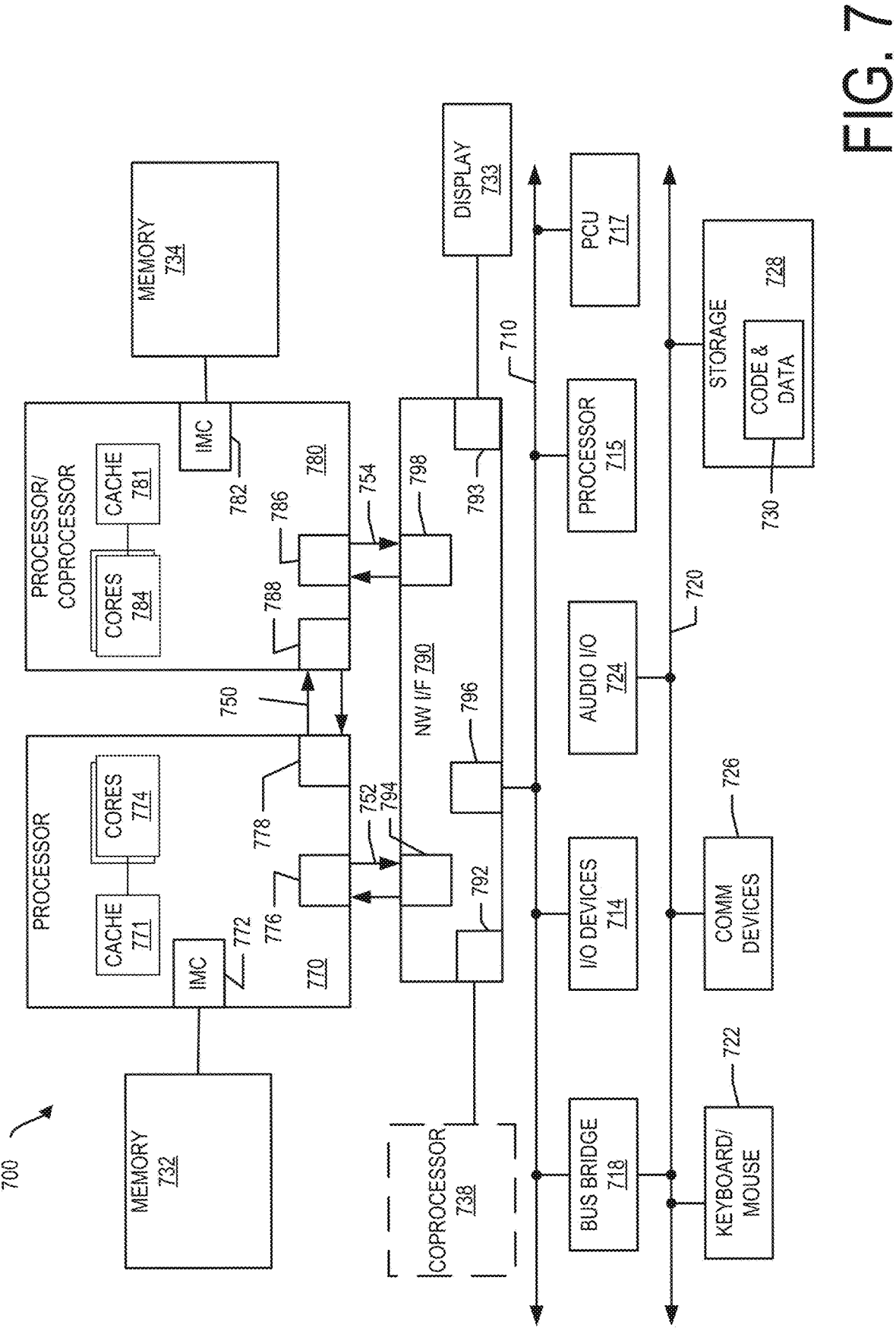
FIG. 7 illustrates an example computing system.

FIG. 7 illustrates an example computing system. Multiprocessor system 700 is an interfaced system and includes a plurality of processors or cores including a first processor 770 and a second processor 780 coupled via an interface 750 such as a point-to-point (P-P) interconnect, a fabric, and/or bus. In some examples, the first processor 770 and the second processor 780 are homogeneous. In some examples, first processor 770 and the second processor 780 are heterogenous. Though the example system 700 is shown to have two processors, the system may have three or more processors, or may be a single processor system. In some examples, the computing system is a system on a chip (SoC). Multiprocessor system 700 is one possible example of processor 530 of FIG. 5. Although intrusion detection unit 550 may be embodied as an embedded controller, in some examples, multiprocessor system 700 may be used to implement processor 552 of intrusion detection unit.

Processors 770 and 780 may be implemented as single core processors or multi-core processors. Processors 770 and 780 may each include a cache 771 and 781 used by their respective cores 774 and 784 (each of which may be a single-core or a multi-core processor), respectively. A shared cache (not shown) may be included in either processor or outside of both processors, yet connected with the processors via P-P interconnect, such that either or both processors' local cache information may be stored in the shared cache if a processor is placed into a low power mode.

Processors 770 and 780 are shown including integrated memory controller (IMC) circuitry 772 and 782, respectively. First processor 770 also includes interface circuits 776 and 778; similarly, second processor 780 includes interface circuits 786 and 788. Processors 770, 780 may exchange information via the interface 750 using interface circuits 778, 788. IMCs 772 and 782 couple the processors 770, 780 to respective memories, namely a memory 732 and a memory 734, which may be portions of main memory locally attached to the respective processors.

Processors 770, 780 may each exchange information with a network interface (NW I/F) 790 via individual interfaces 752, 754 using interface circuits 776, 794, 786, 798. The network interface 790 (e.g., one or more of an interconnect, bus, and/or fabric, and in some examples is a chipset) may optionally exchange information with a coprocessor 738 via an interface circuit 792. In some examples, the coprocessor 738 is a special-purpose processor, such as, for example, a high-throughput processor, a network or communication processor, compression engine, graphics processor, general purpose graphics processing unit (GPGPU), neural-network processing unit (NPU), embedded processor, or the like. Network interface 790 may also provide information to a display 733 using an interface circuit 793, for display to a human user.

A shared cache (not shown) may be included in either processor 770, 780 or outside of both processors, yet connected with the processors via an interface such as P-P interconnect, such that either or both processors' local cache information may be stored in the shared cache if a processor is placed into a low power mode.

Network interface 790 may be coupled to a first interface 710 via interface circuit 796. In some examples, first interface 710 may be an interface such as a Peripheral Component Interconnect (PCI) interconnect, a PCI Express interconnect or another I/O interconnect. In some examples, first interface 710 is coupled to a power control unit (PCU) 717, which may include circuitry, software, and/or firmware to perform power management operations with regard to the processors 770, 780 and/or co-processor 738. PCU 717 provides control information to a voltage regulator (not shown) to cause the voltage regulator to generate the appropriate regulated voltage. PCU 717 also provides control information to control the operating voltage generated. In various examples, PCU 717 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 717 is illustrated as being present as logic separate from first processor 770 and/or second processor 780. In other cases, PCU 717 may execute on a given one or more of cores (not shown) of first processor 770 or second processor 780. In some cases, PCU 717 may be implemented as a microcontroller (dedicated or general-purpose) or other control logic configured to execute its own dedicated power management code, sometimes referred to as P-code. In yet other examples, power management operations to be performed by PCU 717 may be implemented externally to a processor, such as by way of a separate power management integrated circuit (PMIC) or another component external to the processor. In yet other examples, power management operations to be performed by PCU 717 may be implemented within BIOS or other system software.

Various I/O devices 714 may be coupled to first interface 710, along with a bus bridge 718 which couples first interface 710 to a second interface 720. In some examples, one or more additional processor(s) 715, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 710. In some examples, second interface 720 may be a low pin count (LPC) interface. Various devices may be coupled to second interface 720 including, for example, a user interface 722 (such as a keyboard, mouse, touchscreen, or other input devices), communication devices 726 (such as modems, network interface devices, or other types of communication devices that may communicate through a computer network), and storage circuitry 728. Storage circuitry 728 may be one or more non-transitory machine-readable storage media as described below, such as a disk drive or other mass storage device which may include instructions/code and data 730 and may implement the storage 'ISAB03 in some examples. Further, an audio I/O 724 may be coupled to second interface 720. Note that other architectures than the point-to-point architecture described above are possible. For example, instead of the point-to-point architecture, a system such as multiprocessor system 700 may implement a multi-drop interface or other such architecture.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 8:
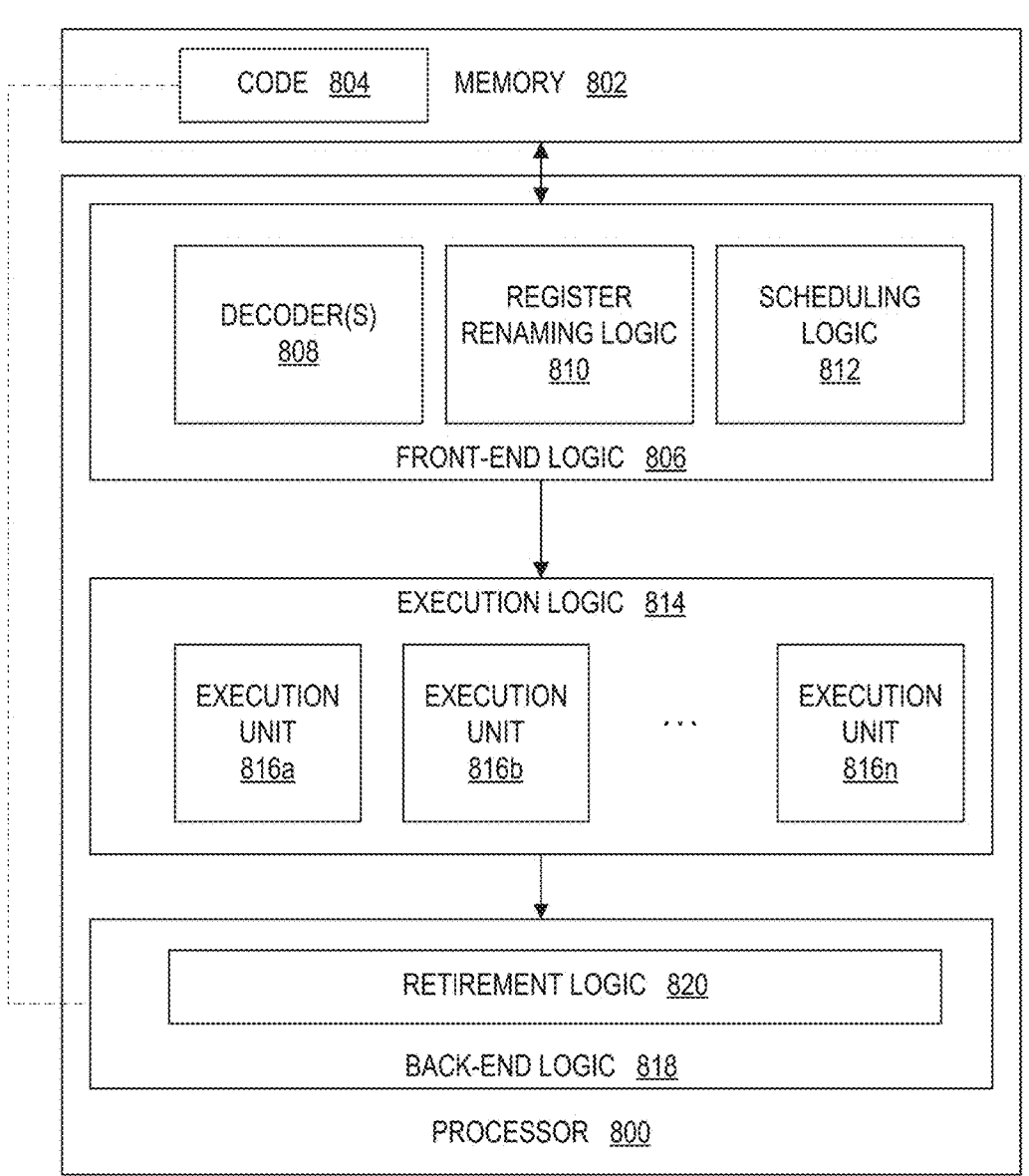
FIG. 8 illustrates an example processor.

FIG. 8 is an example illustration of a processor according to an embodiment. Processor 800 is an example of a type of hardware device that can be used in connection with the implementations above. For example, processor 800 shows one example architecture of various processing elements (e.g., 530) in one or more embodiments shown and described herein. Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Processor 800 is one possible example of processor 530 of FIG. 5 and/or of processor 552 of the intrusion detection unit 550 of FIG. 5.

Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816a, 816b, 816n, etc. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

With regard to this specification generally, unless expressly stated to the contrary, use of the phrases 'at least one of' and 'one or more of' refers to any combination of the named elements, conditions, activities, messages, entries, paging structures, or devices. For example, 'at least one of X, Y, and Z' and 'one or more of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular items (e.g., element, condition, module, activity, operation, claim element, messages, protocols, interfaces, devices etc.) they modify, but are not intended to indicate any type of order, rank, importance, temporal sequence, or hierarchy. For example, 'first X' and 'second X' are intended to designate two separate X elements that are not necessarily limited by any order, rank, importance, temporal sequence, or hierarchy of the two elements, unless specifically stated to the contrary.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of "embodiment" and other exemplarily language does not necessarily refer to the same embodiment or the same example, but may refer to different and distinct embodiments, as well as potentially the same embodiment.

Embodiments of the mechanisms disclosed herein may be implemented in hardware, software, firmware, or a combination of such implementation approaches. Embodiments of this disclosure may be implemented, at least partially, as computer programs or program code executing on programmable systems comprising at least one processor, a storage system (including volatile and non-volatile memory and/or storage elements), at least one input device, and at least one output device.

The architectures presented herein are provided by way of example only and are intended to be non-exclusive and non-limiting. Furthermore, the various parts disclosed are intended to be logical divisions only and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

It is also important to note that the operations in the preceding flowcharts and diagrams illustrating interactions, illustrate only some of the possible activities that may be executed by, or within, computing system 500 using the approaches disclosed herein for providing computer intrusion detection and triggers. Some of these operations may be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

The following examples pertain to embodiments in accordance with this specification.

Example A1 provides an apparatus comprising a circuit board configured for attachment to a cover by a first fastener, the circuit board including a first via sized to receive a distal portion of a first shaft of the first fastener, and a first upper portion of the first shaft is to be received in a first through-hole in the cover. The apparatus further includes a first conductive trace extending from a first side wall defining the first via to first circuitry and configured to carry one or more input signals to the first circuitry indicating whether the distal portion of the first shaft is at least partially disposed in the first via and communicatively coupled to a first conductive element associated with the first via.

Example A2 comprises the subject matter of Example A1, and a second conductive element connects the cover to a system ground of the circuit board.

Example A3 comprises the subject matter of Example A2, and the second conductive element includes another fastener, a wire, or a grounding tape.

Example A4 comprises the subject matter of any one of Examples A1-A3, and the first conductive element includes a first conductive plating at least partially covering the first side wall defining the first via.

Example A5 comprises the subject matter of Example A4, and based on the distal portion of the first shaft being at least partially disposed in the first via and being communicatively coupled to the first conductive plating, and on the first fastener extending through the first through-hole in the cover, a first input signal representing a ground signal is to flow to the first circuitry.

Example A6 comprises the subject matter of any one of Examples A4-A5, and based in part on the first fastener being communicatively disconnected from the first conductive plating, the first conductive trace is to carry a second input signal representing a non-ground signal to the first circuitry.

Example A7 comprises the subject matter of any one of Examples A4-A6, and the first side wall of the circuit board is threaded, and the first conductive plating covers substantially all of the first side wall or part of the first side wall.

Example A8 comprises the subject matter of any one of Examples A4-A7, and the distal portion of the first shaft is to be communicatively coupled with the first conductive plating based on at least some physical contact between the distal portion of the first shaft and the first conductive plating.

Example A9 comprises the subject matter of any one of Examples A1-A8, and further including a second conductive trace extending from a second side wall defining a second via in the circuit board to the first circuitry, the second conductive trace configured to carry one or more other input signals to the first circuitry indicating whether a second distal portion of a second shaft of a second fastener is at least partially disposed in the second via and communicatively coupled to a third conductive element associated with the second via.

Example A10 comprises the subject matter of any one of Examples A1-A9, and the first circuitry is configured to provide an output signal to prompt an action based on at least a first input signal indicating that the distal portion of the first shaft of the first fastener is at least partially removed from the first via and that the first fastener is communicatively disconnected from the first conductive element.

Example S1 provides a system including a first fastener, a circuit board including a side wall defining a first via sized to receive a distal portion of the first fastener, a chassis including a cover spaced from the circuit board and the cover including a first through-hole sized to receive an upper portion of the first fastener, a first conductive trace extending from the side wall of the first via, and an intrusion detection unit configured to receive a first input signal from the first conductive trace indicating whether a portion of the first fastener is at least partially disposed in the first via and communicatively coupled to a first conductive element associated with the first via.

Example S2 comprises the subject matter of Example S1, and further including a second conductive element extending from the cover of the chassis to a system ground of the circuit board.

Example S3 comprises the subject matter of Example S2, and the second conductive element includes another fastener, a wire, or a grounding tape.

Example S4 comprises the subject matter of any one of Examples S1-S3, and the first conductive element includes a first conductive plating at least partially covering the side wall defining the first via in the circuit board.

Example S5 comprises the subject matter of Example S4, and based on the distal portion of the first fastener being at least partially disposed in the first via and communicatively coupled to the first conductive plating and on the first fastener extending through the first through-hole in the cover, the first input signal corresponds to a ground signal.

Example S6 comprises the subject matter of any one of Examples S4-S5, and based in part on the first fastener being communicatively disconnected from the first conductive plating, the first input signal corresponds to a non-ground signal.

Example S7 comprises the subject matter of any one of Examples S4-S6, and the intrusion detection unit is to provide a first output signal to prompt an action, based at least on the first input signal indicating that the distal portion of the first fastener is at least partially removed from the first via and that the first fastener is communicatively disconnected from the first conductive element.

Example S8 comprises the subject matter of any one of Example S7, and the intrusion detection unit comprises an input pin configured to receive the first input signal from the first conductive trace, a memory comprising one or more instructions, and a processor coupled to the memory, the processor to execute the one or more instructions to generate the first output signal based on a particular combination of the first input signal and one or more other input signals associated with one or more other fasteners.

Example S9 comprises the subject matter of Example S8, and the intrusion detection unit includes an embedded controller.

Example S10 comprises the subject matter of any one of Examples S11-S19, and the processor is to execute the one or more instructions further to provide a second output signal to prevent an action, the second output signal based at least on a second input signal indicating that the distal portion of the first fastener is at least partially disposed in the first via and communicatively coupled to the first conductive element.

Example C1 provides one or more machine readable media comprising one or more instructions, and the one or more instructions, when executed by a processor, are to perform operations including receiving a first input value corresponding to a first input signal associated with a first fastener for connecting a circuit board to a cover of a chassis of an electronic device, and generating a first output signal based, at least in part, on the first input value indicating whether a distal portion of the first fastener is at least partially disposed in a first plated through-hole (PTH) formed in the circuit board and is communicatively coupled to a first conductive element associated with the first PTH.

Example C2 comprises the subject matter of Example C1, and the first output signal is to prevent an action based at least in part on the first input value indicating that the distal portion of the first fastener is communicatively connected to the first PTH and the distal portion of the first fastener is at least partially disposed in the first PTH.

Example C3 comprises the subject matter of Example C2, and the first input signal corresponds to a ground signal to indicate that intrusion is not detected.

Example C4 comprises the subject matter of Example C1, and the one or more instructions, when executed by the processor, are to perform operations comprising receiving a plurality of input values corresponding to a plurality of input signals, respectively, the plurality of input signals respectively associated with a plurality of fasteners configured to connect the circuit board to the cover of the chassis, and the first input value is one of the plurality of input values.

Example C5 comprises the subject matter of Example C4, and the first output signal is to prompt an action based at least in part on one input value of the plurality of input values indicating that a particular fastener is communicatively disconnected from a corresponding plated through-hole in the circuit board.

Example C6 comprises the subject matter of Example C4, and the first output signal is to prompt an action based, in part, on a particular combination of the plurality of input values.

Example C7 comprises the subject matter of Example C4, and the first output signal is to prompt an action based at least in part on a particular combination of the plurality of input values indicating that at least a minimum number of fasteners are communicatively disconnected from respective plated through-holes in the circuit board.

Example C8 comprises the subject matter of any one of Examples C5-C7, and at least one input signal of the plurality of input signals corresponds to a non-ground signal to indicate that intrusion is detected.

Example C9 comprises the subject matter of any one of Examples C5-C8, and the action includes at least one of performing a system action, sending an alert, and logging intrusion detection information.

Example C10 comprises the subject matter of any one of Examples C1-C9, and the one or more instructions, when executed by the processor, are to perform operations comprising receiving a second plurality of input values corresponding to a second plurality of input signals, respectively, associated with the first fastener, and generating a second output signal to prompt an action based, in part, on the second plurality of input values corresponding to a pattern of ground contact transitions that indicates tampering.

Example C11 comprises the subject matter of any one of Examples C1-C10, and a conductive element is to connect the cover to a system ground of the circuit board.

Example M1 provides a method that includes receiving, by circuitry on a circuit board, a first input signal on a conductive trace communicatively coupled to a first via in a circuit board, the first via sized to receive a distal portion of a first fastener configured to attach a circuit board to a cover of a chassis of an electronic device. The method of Example M1 further includes generating a first output signal based, at least in part, on the first input signal, and the first input signal is to indicate whether the distal portion of the first fastener is at least partially disposed in the first via and is communicatively coupled to a first conductive element associated with the first via.

Example M2 comprises the subject matter of Example M1, and the first output signal is to prevent an action based at least in part on the first input signal indicating that the distal portion of the first fastener is communicatively connected to a conductive element associated with first via and the distal portion of the first fastener is at least partially disposed in the first via.

Example M3 comprises the subject matter of Example M2, and the first input signal corresponds to a ground signal indicating that no intrusion is detected.

Example M4 comprises the subject matter of Example M1, and further comprising receiving a plurality of input signals, respectively, the plurality of input signals respectively associated with one or more fasteners configured to connect the circuit board to the cover of the chassis, and the first input signal is one of the plurality of input signals.

Example M5 comprises the subject matter of Example M4, and further comprising prompting, by the first output signal, a first action based at least in part on one input value of the plurality of input signals indicating that a particular fastener is communicatively disconnected from a conductive element of the first via.

Example M6 comprises the subject matter of Example M4, and further comprising prompting, by the first output signal, a first action based, in part, on a particular combination of the plurality of input signals.

Example M7 comprises the subject matter of Example M4, and further comprising prompting, by the first output signal, a first action based at least in part on a particular combination of the plurality of input signals indicating that at least a minimum number of fasteners are communicatively disconnected from respective conductive elements associated with respective vias in the circuit board.

Example M8 comprises the subject matter of any one of Examples M5-M7, and the first input signal corresponds to a non-ground signal indicating that intrusion is detected.

Example M9 comprises the subject matter of any one of Examples M5-M8, and the first action includes at least one of performing a system action, sending an alert, and logging intrusion detection information.

Example M10 comprises the subject matter of any one of Examples M1-M9, and further comprising receiving a second plurality of input signals associated with the first fastener, and generating a second output signal to prompt a second action based in part on the second plurality of input signals corresponding to a first pattern of ground contact transitions that indicates tampering.

Example M11 comprises the subject matter of any one of Examples M1-M10, and a conductive element connects the cover to a system ground of the circuit board.

Example X1 provides an apparatus, the apparatus comprising means for performing the method of any one of Examples M1-M11.

Example X2 comprises the subject matter of Example X1 can optionally include that the means for performing the method comprises at least one processor and at least one memory element.

Example X3 comprises the subject matter of Example X2 can optionally include that the at least one memory element comprises machine readable instructions that when executed, cause the apparatus to perform the method of any one of Examples M1-M11.

Example X4 comprises the subject matter of any one of Examples X1-X3 can optionally include that the apparatus is one of a computing system, a processing element, or a system-on-a-chip.

The invention claimed is:

1. An apparatus comprising:
   a circuit board including first circuitry and a system ground conductor, the circuit board configured for attachment to a cover by a first fastener, the circuit board including a first via defined by a first side wall with a first conductive plating, the first via sized to receive a distal portion of the first fastener; and
   a first conductive trace extending from the first conductive plating on the first side wall defining the first via to the first circuitry and configured to carry one or more input signals to the first circuitry indicating whether the distal portion of the first fastener is at least partially disposed in the first via and electrically coupled to the first conductive plating on the first side wall of the first via;
   wherein the circuit board is configured such that, when a first portion of the first fastener extends through a through-hole of the cover and the distal portion of the first fastener is at least partially disposed in the first via and in contact with the first conductive plating, and when the cover is electrically coupled to the system ground conductor, a ground loop is to form between the system ground conductor and the first conductive plating through the first fastener such that a first input signal representing a ground signal resulting from the ground loop is to be provided to the first circuitry.

2. The apparatus of claim 1, wherein a conductive element connects the cover to the system ground conductor of the circuit board.

3. The apparatus of claim 2, wherein the conductive element includes another fastener, a wire, or a grounding tape.

4. The apparatus of claim 2, wherein the first conductive plating at least partially covers the first side wall defining the first via.

5. The apparatus of claim 1, wherein, when the first fastener is electrically disconnected from the first conductive plating, the first conductive trace is to carry a second input signal representing a non-ground signal to the first circuitry.

6. The apparatus of claim 1, wherein the first side wall of the circuit board is threaded, wherein the first conductive plating covers substantially all of the first side wall or part of the first side wall.

7. The apparatus of claim 1, further comprising:
   a second conductive trace extending from a second conductive plating on a second side wall defining a second via in the circuit board to the first circuitry, the second conductive trace configured to carry one or more other input signals to the first circuitry indicating whether a second distal portion of a second fastener is at least partially disposed in the second via and electrically coupled to the second conductive plating on the second side wall of the second via.

8. The apparatus of claim 1, wherein the first circuitry is configured to provide an output signal to prompt an action based on at least a third input signal indicating that the distal portion of the first fastener is at least partially removed from the first via and that the first fastener is electrically disconnected from the first conductive plating.

9. A system comprising:
   a first fastener;
   a circuit board including a side wall with a conductive plating, the side wall defining a first via sized to receive a distal portion of the first fastener, the circuit board further including a system ground conductor;
   a chassis including a cover spaced from the circuit board, the cover including a through-hole sized to receive an upper portion of the first fastener;
   a first conductive trace extending from the conductive plating on the side wall of the first via; and
   an intrusion detection unit configured to receive a first input signal from the first conductive trace representing a ground signal resulting from a ground loop that is to be formed between the system ground conductor and the conductive plating through the first fastener when the cover is electrically coupled to the system ground conductor and when the distal portion of the first fastener is at least partially disposed in the first via and electrically coupled to the conductive plating on the side wall of the first via.

10. The system of claim 9, further comprising:

a conductive element extending from the cover of the chassis to the system ground conductor of the circuit board.

11. The system of claim 9, wherein the conductive plating at least partially covers the side wall defining the first via in the circuit board.

12. The system of claim 9, wherein the intrusion detection unit is to:

provide a first output signal to prompt an action, based at least on a second input signal indicating that the distal portion of the first fastener is at least partially removed from the first via and that the first fastener is electrically disconnected from the first conductive trace.

13. The system of claim 12, wherein the intrusion detection unit comprises:

an input pin configured to receive one or more input signals from the first conductive trace;

a memory comprising one or more instructions; and a processor coupled to the memory, the processor to execute the one or more instructions to:

generate the first output signal based on a particular combination of the second input signal and one or more other input signals.

14. The system of claim 13, wherein the intrusion detection unit includes an embedded controller.

15. The system of claim 13, wherein the processor is to execute the one or more instructions further to:

provide a second output signal to prevent a second action, the second output signal based at least on the first input signal indicating that the distal portion of the first fastener is at least partially disposed in the first via and electrically coupled to the conductive plating.

16. The system of claim 9, further comprising:

a second conductive trace extending from a second conductive plating on a second side wall defining a second via in the circuit board, wherein the intrusion detection unit is further configured to receive one or more other input signals from the second conductive trace indicating whether a second distal portion of a second fastener is at least partially disposed in the second via and electrically coupled to the second conductive plating on the second side wall of the second via.

17. One or more machine-readable media comprising one or more instructions, wherein the one or more instructions, when executed by a processor, are to perform operations comprising:

receiving a first input value corresponding to a first input signal from a conductive trace on a circuit board, the first input signal associated with a first fastener configured to mechanically attach and electrically couple the circuit board to a cover of a chassis of an electronic device; and generating a first output signal based, at least in part, on the first input value, wherein the first input value is to indicate whether a ground loop is formed between a system ground conductor of the circuit board and a conductive plating on a side wall of a via in the circuit board through the first fastener when (i) a first portion of the first fastener extends through a through-hole of the cover and a distal portion of the first fastener is at least partially disposed in the via and in contact with the conductive plating, and (ii) the cover is electrically coupled to the system ground conductor.

18. The one or more machine-readable media of claim 17, wherein the one or more instructions, when executed by the processor, are to perform the operations, the operations further comprising:

receiving a plurality of input values corresponding to a plurality of input signals, respectively, the plurality of input signals respectively associated with a plurality of fasteners configured to mechanically attach and electrically couple the circuit board to the cover of the chassis, wherein the first input value is one of the plurality of input values, wherein the first output signal is based, in part, on a particular combination of the plurality of input values.

19. The one or more machine-readable media of claim 17, wherein the one or more instructions, when executed by the processor, are to perform the operations, the operations further comprising:

receiving a plurality of input values corresponding to a plurality of input signals, respectively, associated with the first fastener, wherein the first input value is one of the plurality of input values; and generating a second output signal to prompt an action based, in part, on the plurality of input values corresponding to a pattern of ground contact transitions that indicates tampering.

* * * * *